(12) United States Patent
Beshara et al.

(10) Patent No.: US 12,182,525 B2
(45) Date of Patent: Dec. 31, 2024

(54) AUTOMATICALLY GENERATING CONTEXT-BASED ALTERNATIVE TEXT USING ARTIFICIAL INTELLIGENCE TECHNIQUES

(71) Applicant: Dell Products L.P., Round Rock, TX (US)

(72) Inventors: Shary Beshara, Cairo (EG); Amy Seibel, Newton, MA (US); Kranti Uppala, Milford, MA (US); Eric Bruno, Shirley, NY (US)

(73) Assignee: Dell Products L.P., Round Rock, TX (US)

( * ) Notice: Subject to any disclaimer, the term of this patent is extended or adjusted under 35 U.S.C. 154(b) by 321 days.

(21) Appl. No.: 17/580,951

(22) Filed: Jan. 21, 2022

(65) Prior Publication Data

US 2023/0237280 A1 Jul. 27, 2023

(51) Int. Cl.
| | | |
|---|---|---|
| *G06F 40/117* | (2020.01) | |
| *G06F 40/12* | (2020.01) | |
| *G06F 40/56* | (2020.01) | |
| *G06V 10/75* | (2022.01) | |
| *G06V 20/70* | (2022.01) | |
| *G06V 30/24* | (2022.01) | |

(52) U.S. Cl.
CPC ............ *G06F 40/56* (2020.01); *G06V 10/759* (2022.01); *G06V 30/24* (2022.01)

(58) Field of Classification Search
CPC .............. G06F 16/583; G06F 16/5846; G06F 16/5866; G06F 40/117; G06F 40/12; G06F 40/279; G06F 40/30; G06V 10/70; G06V 10/7784; G06V 10/86; G06V 20/70; G06V 20/80
USPC .......................... 704/1, 9; 382/155, 159, 114
See application file for complete search history.

(56) References Cited

U.S. PATENT DOCUMENTS

| | | | |
|---|---|---|---|
| 6,957,231 B1 * | 10/2005 | Lubbers | G06F 40/166 |
| 10,902,214 B2 | 1/2021 | DeFelice | |
| 10,984,176 B2 * | 4/2021 | Johnson | G06F 40/205 |
| 11,494,431 B2 * | 11/2022 | Koh | G06F 40/169 |
| 2006/0041430 A1 | 2/2006 | Roth et al. | |
| 2009/0125544 A1 * | 5/2009 | Brindley | G06F 40/117 |

(Continued)

*Primary Examiner* — Martin Lerner
(74) *Attorney, Agent, or Firm* — Ryan, Mason & Lewis, LLP (57) ABSTRACT

Methods, apparatus, and processor-readable storage media for automatically generating context-based alternative text using artificial intelligence techniques are provided herein. An example computer-implemented method includes generating text captions for an image derived from a web page by processing the image using an artificial intelligence-based image captioning model; determining context information pertaining to the image by processing the image using an artificial intelligence-based context and emotion recognition library; generating context-based alternative text for at least a portion of the image by processing, using at least one artificial intelligence-based alternative text generation model, at least a portion of one or more of the generated text caption(s) for the image and the determined context information pertaining to at least a portion of the image; and performing one or more automated actions based on the generated context-based alternative text.

20 Claims, 5 Drawing Sheets

(56) References Cited

U.S. PATENT DOCUMENTS

| | | | |
|---|---|---|---|
| 2012/0158504 A1* | 6/2012 | Kumar | G06Q 30/0269 |
| | | | 705/14.53 |
| 2014/0033003 A1* | 1/2014 | Johnson | G06F 40/205 |
| | | | 715/201 |
| 2014/0067818 A1* | 3/2014 | Bao | G06F 16/9535 |
| | | | 707/758 |
| 2014/0146053 A1* | 5/2014 | Cragun | G06F 16/583 |
| | | | 345/467 |
| 2017/0286383 A1* | 10/2017 | Koul | G06F 40/169 |
| 2017/0337220 A1* | 11/2017 | Metz | G06F 40/56 |
| 2019/0065449 A1* | 2/2019 | Lee | G06F 40/166 |
| 2019/0228552 A1 | 7/2019 | Lee et al. | |
| 2020/0073936 A1* | 3/2020 | Jankowski | G06F 40/279 |
| 2020/0082002 A1 | 3/2020 | Whitman et al. | |
| 2020/0175053 A1* | 6/2020 | Zheng | G06F 16/583 |
| 2020/0175063 A1* | 6/2020 | Santos Moraes | G06F 16/51 |
| 2021/0064879 A1* | 3/2021 | Gupta | G06F 40/30 |
| 2021/0073617 A1* | 3/2021 | Bazzani | G06F 40/117 |
| 2021/0125389 A1 | 4/2021 | Tommy et al. | |
| 2023/0179778 A1* | 6/2023 | Yamashita | G06F 16/783 |
| | | | 375/240.08 |

* cited by examiner

AUTOMATICALLY GENERATING CONTEXT-BASED ALTERNATIVE TEXT USING ARTIFICIAL INTELLIGENCE TECHNIQUES

FIELD

The field relates generally to information processing systems, and more particularly to techniques for increased user accessibility using such systems.

BACKGROUND

A significant number of websites are inaccessible to blind and visually-impaired users. For example, sighted people are often more attracted to images than words, which leads website designers to rely on images that, in many cases, blind and visually-impaired users cannot effectively interpret. Alternative text, also commonly referred to as ALT text, refers to a description of an image that can be written, for example, using hypertext markup language (HTML) elements. The use of ALT text attempts to render websites more accessible for users. However, in conventional ALT text approaches, human users typically must determine and manually enter the ALT text for a given image, which often results in errors and delays.

SUMMARY

Illustrative embodiments of the disclosure provide techniques for automatically generating context-based alternative text using artificial intelligence techniques. An exemplary computer-implemented method includes generating one or more text captions for an image derived from a web page by processing at least a portion of the image using at least one artificial intelligence-based image captioning model, and determining context information pertaining to at least a portion of the image by processing one or more portions of the image using at least one artificial intelligence-based context and emotion recognition library. Additionally, the method includes generating context-based alternative text for at least a portion of the image by processing, using at least one artificial intelligence-based alternative text generation model, at least a portion of one or more of the one or more generated text captions for the image and the determined context information pertaining to at least a portion of the image, and performing one or more automated actions based at least in part on the generated context-based alternative text.

Illustrative embodiments can provide significant advantages relative to conventional alternative text approaches. For example, problems associated with errors and delays are overcome in one or more embodiments through automatically generating context-based alternative text using artificial intelligence techniques.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
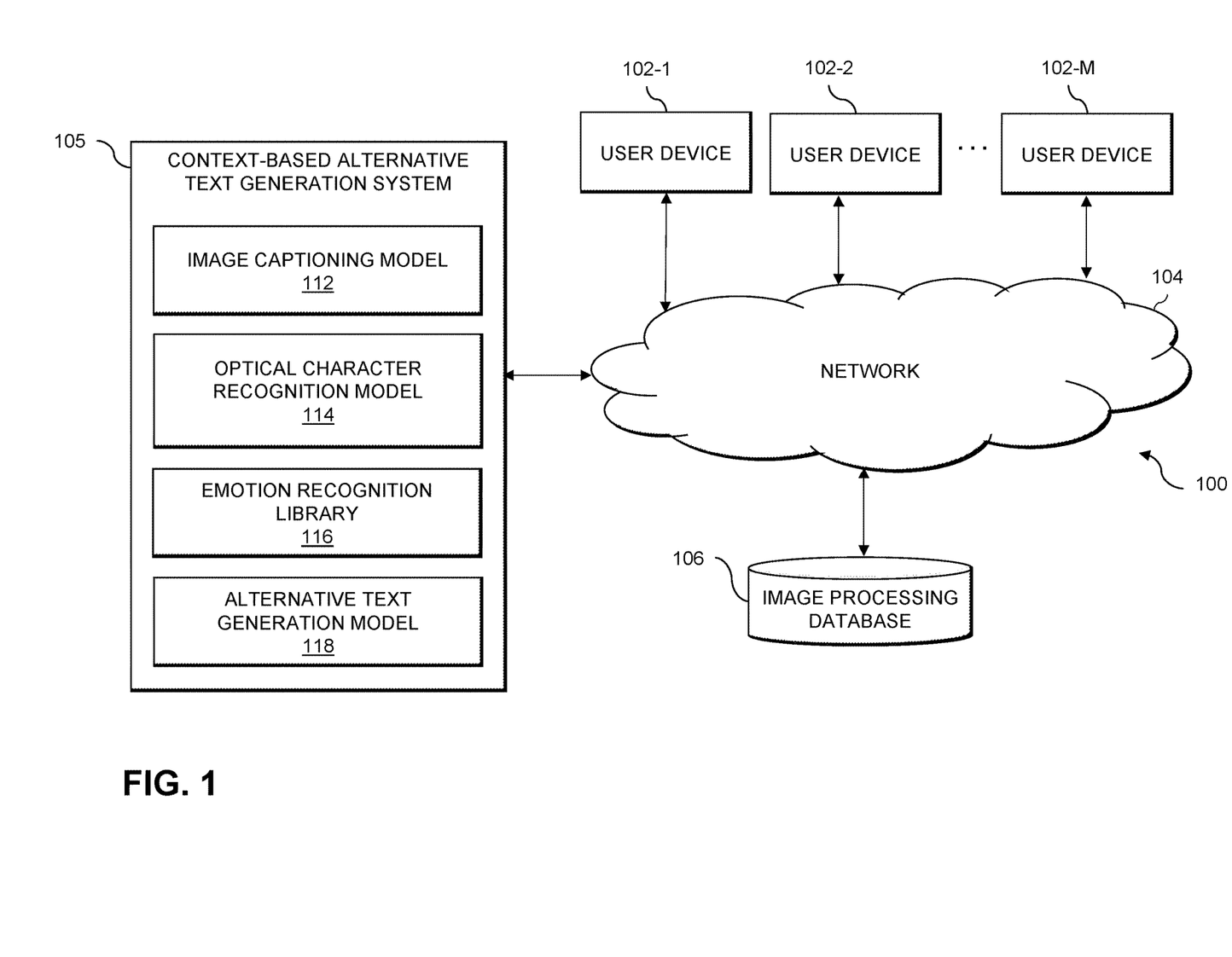
FIG. 1 shows an information processing system configured for automatically generating context-based alternative text using artificial intelligence techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is context-based alternative text generation system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, context-based alternative text generation system 105 can have an associated image processing database 106 configured to store data pertaining to images from various web pages, which comprise, for example, historical image-related data derived from various processing models and/or artificial intelligence techniques.

The image processing database 106 in the present embodiment is implemented using one or more storage systems associated with context-based alternative text generation system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with context-based alternative text generation system 105 are one or more input-output devices, which illustratively comprise keyboards, displays or other types of input-output devices in any combination. Such input-output devices can be used, for example, to support one or more user interfaces to context-based alternative text generation system 105, as well as to support communication between context-based alternative text generation system 105 and other related systems and devices not explicitly shown.

Additionally, context-based alternative text generation system 105 in the FIG. 1 embodiment is assumed to be implemented using at least one processing device. Each such processing device generally comprises at least one processor and an associated memory, and implements one or more functional modules for controlling certain features of context-based alternative text generation system 105.

More particularly, context-based alternative text generation system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media. The network interface allows context-based alternative text generation system 105 to communicate over the network 104 with the user devices 102, and illustratively comprises one or more conventional transceivers.

The context-based alternative text generation system 105 further comprises image captioning model 112, optical character recognition (OCR) model 114, emotion recognition library 116, and alternative text generation model 118.

It is to be appreciated that this particular arrangement of elements 112, 114, 116 and 118 illustrated in the context-based alternative text generation system 105 of the FIG. 1 embodiment is presented by way of example only, and alternative arrangements can be used in other embodiments. For example, the functionality associated with elements 112, 114, 116 and 118 in other embodiments can be combined into a single module, or separated across a larger number of modules. As another example, multiple distinct processors can be used to implement different ones of elements 112, 114, 116 and 118 or portions thereof.

At least portions of elements 112, 114, 116 and 118 may be implemented at least in part in the form of software that is stored in memory and executed by a processor.

It is to be understood that the particular set of elements shown in FIG. 1 for automatically generating context-based alternative text using artificial intelligence techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, context-based alternative text generation system 105 and image processing database 106 can be on and/or part of the same processing platform.

An exemplary process utilizing elements 112, 114, 116 and 118 of an example context-based alternative text generation system 105 in computer network 100 will be described in more detail with reference to the flow diagram of FIG. 3.

Accordingly, at least one embodiment includes automatically generating context-based alternative text using artificial intelligence techniques. As noted herein, ALT text for images can be used to provide a written description of one or more images on a web page. As further detailed herein, one or more embodiments include integrating one or more abstract concepts such as emotion recognition into ALT text auto-generation to provide context-based ALT text to users (e.g., blind and/or visually-impaired users).

At least one embodiment includes generating context-based ALT text to improve accessibility by using one or more computer vision (CV) techniques, a type of artificial intelligence technique configured for processing images and extracting information from the processed images, as well as one or more natural language process (NLP) techniques, a type of artificial intelligence technique configured for analyzing and/or generating natural language data. Such an embodiment includes implementing such CV and NLP techniques to add context-based information to at least one ALT text auto-generation process by intelligently determining and incorporating one or more detected emotions and/or other abstract concepts (such as, for example, scenery descriptions, actions, event types, etc.) from images to facilitate users (e.g., blind and/or visually-impaired users) access to and/or understanding of the content of the given images.

In integrating determined emotional indications and/or other types of context-based information into an ALT text auto-generation process can include, in one or more embodiments, the following steps. Initially, a determination is made that image captioning and/or enhanced image captioning is needed and/or desired for at least one given image, and if so, an image captioning model is implemented. Additionally, such an embodiment includes processing at least a portion of the at least one given image using at least one OCR model, which can include converting portions of images of typed, handwritten, and/or printed text into machine-encoded text. Also, such an embodiment includes implementing at least one emotion recognition library and/or similar tool that encompasses one or more abstract concepts (e.g., verbs).

At least portions of the outputs of the above-noted models are provided to and/or processed by an ALT text generation model, which automatically generates ALT text for the at least one image based at least in part on the model outputs and/or updates previously generated ALT text for the at least one image based at least in part on the model outputs. By way merely of illustration, consider an example scenario which includes an image of a grandfather and his grandson looking at a computer screen and smiling at a picture of the two of them fishing. Conventional alternative text approaches might process such an image and generate ALT text comprising "Two people looking at a computer," while one or more embodiments can include generating enhanced ALT text such as, for instance, "A man and a boy looking at a picture of them on a computer screen and smiling." By way of further example, rather than conventionally-generated ALT text of "Man, woman, boy, girl, smiling, indoors," one or more embodiments can include generating enhanced ALT text such as, for instance, "A family happily playing a board game together in a kitchen," which infers from the given image an emotion, an action, a location, and a relationship.

Additionally, in one or more embodiments, a user feedback model can be incorporated and/or implemented, wherein feedback provided by the user, in response to the ALT text automatically generated by the ALT text generation model, is processed by one or more of the above-noted models and/or used to re-train one or more of the above-noted models.

Such an embodiment is described in more detail below and in connection with FIG. 2. For example, various deep learning models (e.g., convolutional neural networks (such as, for example, VGGNet), residual neural networks (ResNet), and/or deep neural networks (such as, for example, Inception)) can be used to generate captions and/or tags from a given image. Also (e.g., subsequent to the above-noted caption and/or tag generation process), the image can be passed to and/or processed by an OCR model to extract any handwritten and/or printed text identified in the image. An emotion recognition or similar type of context library can further be used to determine and/or derive facial and/or gesture data from the image and detect one or more emotional cues and/or indications derived from at least a portion of such data. To detect other abstract concepts (e.g., action types, scenery descriptions), one or more other types of libraries can also be used. Further, at least a portion of the data derived from the image is ultimately fed to and/or processed by an ALT text generation model to generate enhanced ALT text and/or update previously-generated ALT text.

Figure 2:
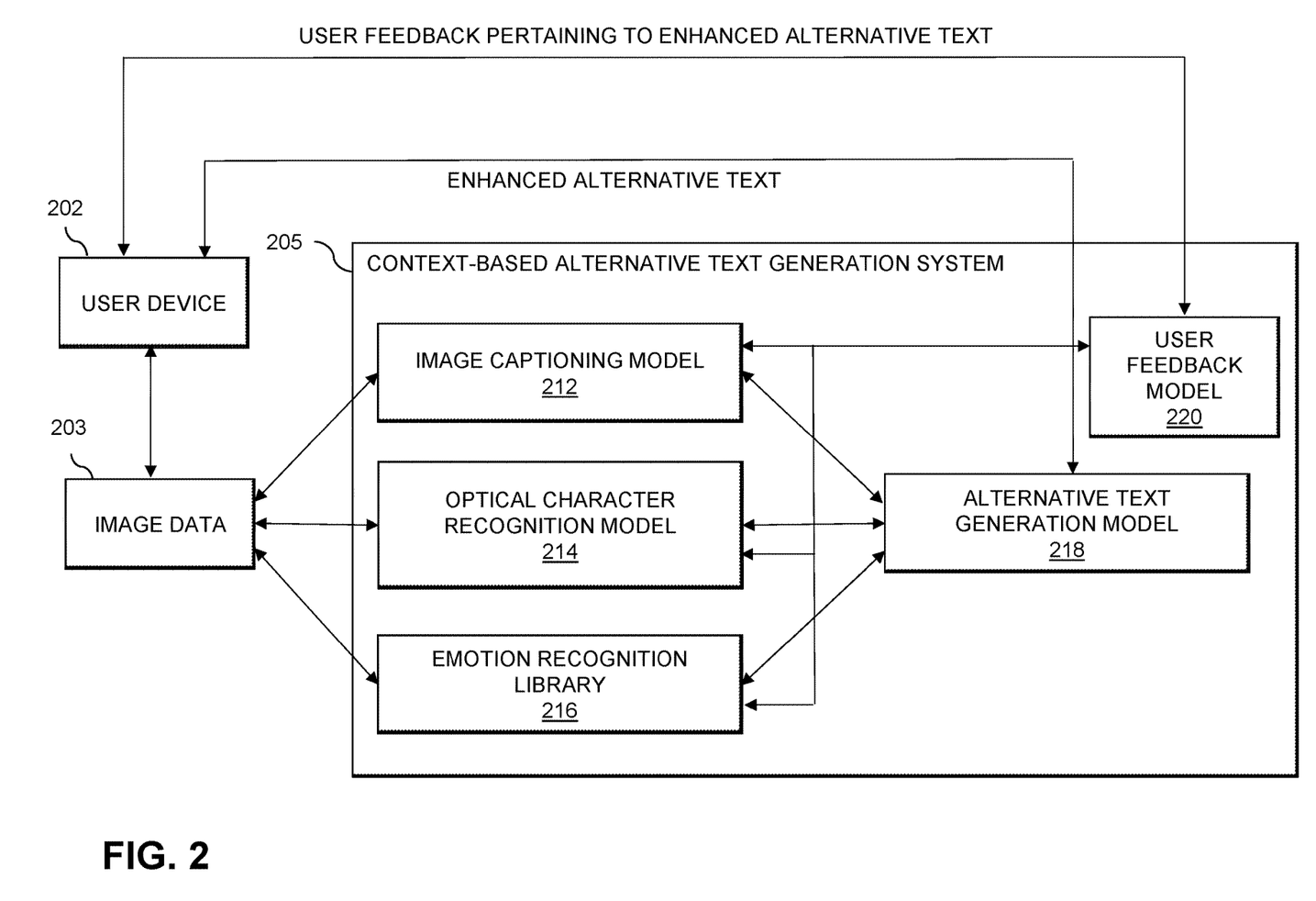
FIG. 2 shows example component architecture for automatically generating context-based alternative text using artificial intelligence techniques in an illustrative embodiment.

FIG. 2 shows example component architecture for automatically generating context-based alternative text using artificial intelligence techniques in an illustrative embodiment. By way of illustration, FIG. 2 depicts context-based alternative text generation system 205, which includes image captioning model 212, OCR model 214, emotion recognition library 216, alternative text generation model 218, and user feedback model 220. FIG. 2 also depicts user device 202, which accesses and/or provides image data 203 (e.g., image data derived from an image that the user device accesses on a web page) to image captioning model 212, OCR model 214, and emotion recognition library 216, which process at least a portion of image data 203 as detailed above and further below.

As also illustrated in FIG. 2, at least portions of the outputs generated by image captioning model 212, OCR model 214, and emotion recognition library 216 are provided to and/or processed by alternative text generation model 218, which uses such outputs to generate and/or update enhanced alternative text pertaining to the image data 203. Alternative text generation model 218 outputs such enhanced alternative text to user device 202, and user device 202 can provide feedback on the enhanced alternative text to user feedback model 220. In such an embodiment, user feedback model 220 can, using at least a portion of the provided feedback, update and/or re-train image captioning model 212, OCR model 214, and/or emotion recognition library 216.

More specifically, in one or more embodiments (similar to the example embodiment depicted in FIG. 2), a determination is made (e.g., by a developer, by an application, or by an end-user tool) that an image is missing ALT text or that existing ALT text for the image can be improved. For example, such a determination can be made automatically based at least in part on the absence of ALT text within the tagged entry within the page's HTML code; an automated system can parse the HTML to make this determination. Subsequent to such a determination, at least a portion of the image can be passed to and/or processed by an image captioning model (e.g. Azure computer vision application programming interface (API)). By way of example, in performing a captioning task, an artificial intelligence system, using a trained machine learning model, can analyze the given image to determine context-related information associated with the image (e.g., people, devices, surroundings, facial expressions, hand placement, posture, etc.). By way of additional example, in performing a captioning task, an OCR system can attempt to detect and decode any text in the image foreground and background, and use such text as associative text. In either and/or additional examples, the results of such captioning tasks can be used to instruct a system that detects human emotion.

By way merely of example, a generated caption might include text such as "a group of people sitting silently around a table with a laptop looking nervous," and in such an embodiment, the resulting tags might include "person," "indoor," and "people."

Additionally, in such an embodiment, an emotion recognition library (e.g., Azure face API, Deepface library, etc.) can be used to extract and process data pertaining to at least a portion of the faces from the image, and determine and/or predict the emotional indication(s) corresponding thereto. In one or more embodiments, such models and/or libraries can perform extraction and detection tasks by training convolutional neural network-based (CNN-based) models to detect emotion from images, and using the trained models to detect one or more emotions from one or more images. By way merely of illustration, consider an example wherein an image includes four faces, and implementation of an emotion recognition library detects emotion, age, and gender for each face. In such an embodiment, an example resulting output of the emotion recognition library might include the following:

Face1: {age: 23.0, gender: female, emotion: {anger: 0.0, contempt: 0.004, disgust: 0.001, fear: 0.0, happiness: 0.261, neutral: 0.718, sadness: 0.015, surprise: 0.0};

Face2: {age: 20.0, gender: female, emotion: {anger: 0.0, contempt: 0.0, disgust: 0.0, fear: 0.0, happiness: 0.0, neutral: 0.998, sadness: 0.002, surprise: 0.0};

Face3: {age: 35.0, gender: female, emotion: {anger: 0.0, contempt: 0.0, disgust: 0.0, fear: 0.0, happiness: 1.0, neutral: 0.0, sadness: 0.0, surprise: 0.0};

Face4: {age: 36.0, gender: female, emotion: {anger: 0.0, contempt: 0.002, disgust: 0.0, fear: 0.0, happiness: 0.185, neutral: 0.812, sadness: 0.001, surprise: 0.0}.

Also, such an embodiment includes providing the image to an OCR model (e.g., EasyOCR, Azure computer vision API, etc.) to extract handwritten and/or printed text in the image. By way of example, in performing a text extraction task, such a model can preprocess the image in multiple steps (e.g., convert the image to black and white, align the horizontal lines of the image, remove noise from the image, etc.) and subsequently pass the image through a pre-trained model to extract text from the image.

Subsequently, at least a portion of the gathered and/or generated data (i.e., the results and/or outputs of the image captioning model, the OCR model, and/or the emotion recognition library) is used to fine-tune (i.e., updating and/or retraining with additional data) a pre-trained ALT text generation model (e.g., OpenAI GPT3, OpenAI GPT2, T5 transformer, etc.). Also, in one or more embodiments, ALT text generated manually as an expected output can be used to compare with and/or further fine-tune the ALT text generation model. After fine-tuning, the model will be able to determine enhanced ALT text for other similar inputs. As part of this process, if a given image is surrounded by text and/or has text approximate thereto, the data output from the image captioning model, the OCR model, and/or the emotion recognition library can be input to a text generation tool (e.g., OpenAI).

In at least one embodiment, the generated enhanced ALT text can be automatically inserted into one or more appropriate portions of given application code (e.g., as an HTML tag) and/or can be output to one or more users for review prior to implementation. With respect to determining the appropriate portions of code, the generated enhanced ALT text can be inserted into the correct and/or appropriate place within the document by parsing the content itself (such as the HTML tags for a web page, for example), and filling in the missing text for the appropriate tag. Additionally, users can set one or more configuration preferences and/or policies for handling missing or inadequate ALT text. For example, if a user is a developer, that user may decide to leave existing ALT text as is, but add it programmatically using the techniques detailed herein if ALT text is missing. Alternatively, a user may decide to update existing ALT text that lacks context that can be added through the techniques detailed herein (for example, by determining and incorporating one or more emotion identifiers into the ALT text and/or underlying code). By way of further example, if a user is an end-user using a screen reader, for instance, when the user interacts with sites utilizing the techniques detailed herein, the user may configure a policy with the user's preferences for how the screen reader may handle original versus auto-enhanced text.

As also detailed herein, in one or more embodiments, users can provide feedback, for example, on the quality of the generated ALT text, and that feedback can be used to update one or more of the models described above and herein.

Additionally, one or more embodiments can be implemented in connection with various contexts and use cases. For example, at least one embodiment can be implemented in connection with image search engine optimization (SEO), wherein search engines typically do not understand images. Using context-based ALT text generated via such an embodiment can enable search engines crawlers to index images more accurately, which strengthens the corresponding website's SEO. Alternatively, at least one embodiment can be implemented in uses cases involving users with low bandwidth (e.g., users who may not be able to easily download and/or view images), as enhancing ALT text via an example embodiment improves the accessibility and value of websites that contain images. As yet another example, at least one embodiment can be implemented in use cases involving users who are blind and/or visually impaired, wherein improving the context and description of ALT text for images (via an example embodiment) enhances the accessibility and value of websites to such users.

It is to be appreciated that a "model," as used herein, refers to an electronic digitally stored set of executable instructions and data values, associated with one another, which are capable of receiving and responding to a programmatic or other digital call, invocation, and/or request for resolution based upon specified input values, to yield one or more output values that can serve as the basis of computer-implemented recommendations, output data displays, machine control, etc.

Persons of skill in the field may find it convenient to express models using mathematical equations, but that form of expression does not confine the model(s) disclosed herein to abstract concepts; instead, each model herein has a practical application in a processing device in the form of stored executable instructions and data that implement the model using the processing device.

Figure 3:
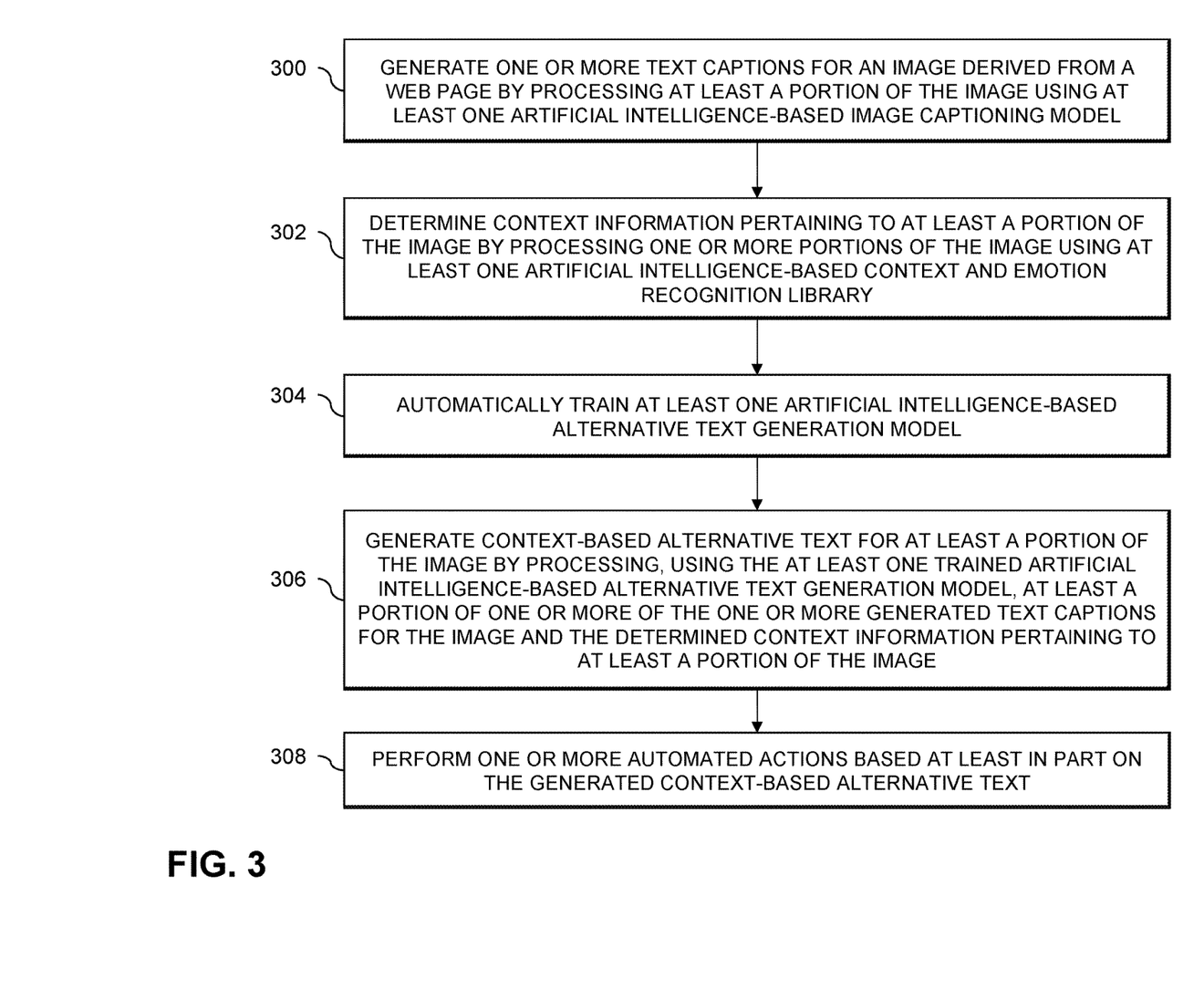
FIG. 3 is a flow diagram of a process for automatically generating context-based alternative text using artificial intelligence techniques in an illustrative embodiment.

FIG. 3 is a flow diagram of a process for automatically generating context-based alternative text using artificial intelligence techniques in an illustrative embodiment. It is to be understood that this particular process is only an example, and additional or alternative processes can be carried out in other embodiments.

In this embodiment, the process includes steps 300 through 308. These steps are assumed to be performed by the context-based alternative text generation system 105 utilizing elements 112, 114, 116 and 118.

Step 300 includes generating one or more text captions for an image derived from a web page by processing at least a portion of the image using at least one artificial intelligence-based image captioning model. In one or more embodiments, processing at least a portion of the image using at least one artificial intelligence-based image captioning model includes processing the at least a portion of the image using one or more deep learning models. In such an embodiment, processing the at least a portion of the image using one or more deep learning models can include processing the at least a portion of the image using at least one of one or more convolutional neural networks, one or more residual neural networks, and one or more deep neural networks.

Step 302 includes determining context information pertaining to at least a portion of the image by processing one or more portions of the image using at least one artificial intelligence-based context and emotion recognition library. In at least one embodiment, determining context information pertaining to at least a portion of the image includes identifying at least one of one or more facial gestures and one or more body gestures in the image, and determining one or more emotional indications derived from the at least one of one or more identified facial gestures and one or more identified body gestures. Additionally or alternatively, determining context information pertaining to at least a portion of the image can include automatically identifying one or more actions depicted in the at least a portion of the image, automatically identifying one or more scenery variables depicted in the at least a portion of the image, and/or automatically identifying one or more event types depicted in the at least a portion of the image.

Step 304 includes automatically training at least one artificial intelligence-based alternative text generation model. In one or more embodiments, such automatic training can include automatically training the at least one artificial intelligence-based alternative text generation model using at least one of one or more supervised learning techniques (e.g., based at least in part on an annotated database of multiple images) and one or more unsupervised learning techniques. In such an embodiment, an annotated database of multiple images used in connection with one or more supervised techniques can include text captions (e.g., generated using the at least one artificial intelligence-based image captioning model) for at least a portion of the multiple images, and context information (e.g., determined using the at least one artificial intelligence-based context and emotion recognition library) pertaining to at least a portion of the multiple images. Alternatively, in one or more other embodiments, the automatic training of the at least one artificial intelligence-based alternative text generation model can be carried out in a separate process (e.g., by different processing devices in different systems) from the other techniques detailed in connection with FIG. 3.

Step 306 includes generating context-based alternative text for at least a portion of the image by processing, using the at least one trained artificial intelligence-based alternative text generation model, at least a portion of one or more of the one or more generated text captions for the image and the determined context information pertaining to at least a portion of the image. In one or more embodiments, generating context-based alternative text for at least a portion of the image includes updating an existing set of alternative text for the at least a portion of the image.

Step 308 includes performing one or more automated actions based at least in part on the generated context-based alternative text. In at least one embodiment, performing one or more automated actions includes automatically inserting the generated context-based alternative text into at least one portion of application code associated with the web page. Additionally or alternatively, performing one or more automated actions can include obtaining user feedback pertaining to the generated context-based alternative text, and training, using at least a portion of the user feedback, one or more of the at least one artificial intelligence-based image captioning model, the at least one artificial intelligence-based optical character recognition model, and the at least one artificial intelligence-based context and emotion recognition library.

The techniques depicted in FIG. 3 can also include extracting text from the image by processing one or more portions of the image using at least one artificial intelligence-based optical character recognition model, and automatically training the at least one artificial intelligence-based alternative text generation model using at least a portion of one or more of the one or more generated text captions for the image, the extracted text from the image, and the determined context information pertaining to at least a portion of the image.

Accordingly, the particular processing operations and other functionality described in conjunction with the flow diagram of FIG. 3 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically generate context-based alternative text using artificial intelligence techniques. These and other embodiments can effectively overcome problems associated with errors and delays.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Figure 4:
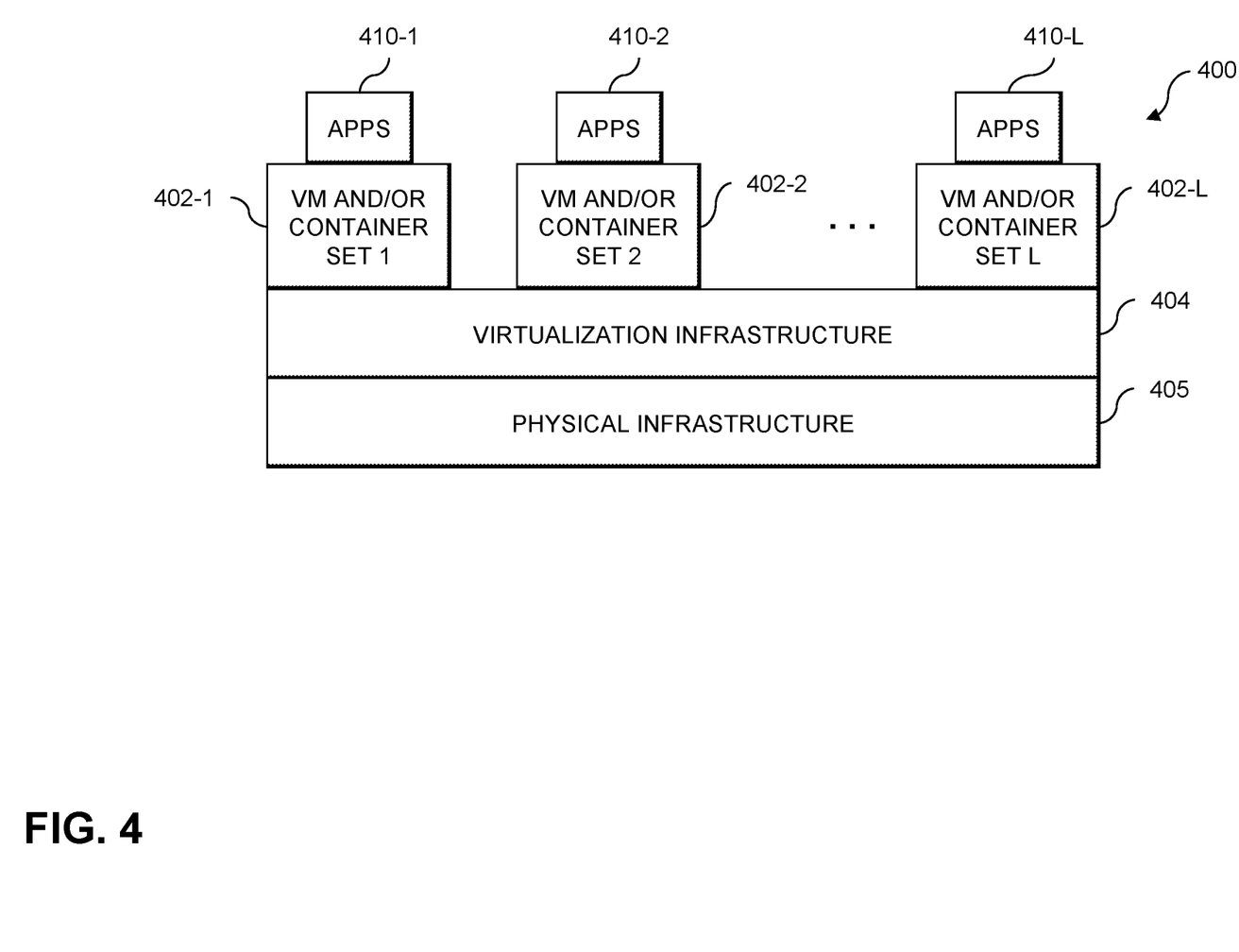
FIGS. 4 and 5 show examples of processing platforms that may be utilized to implement at least a portion of an information processing system in illustrative embodiments.
Figure 5:
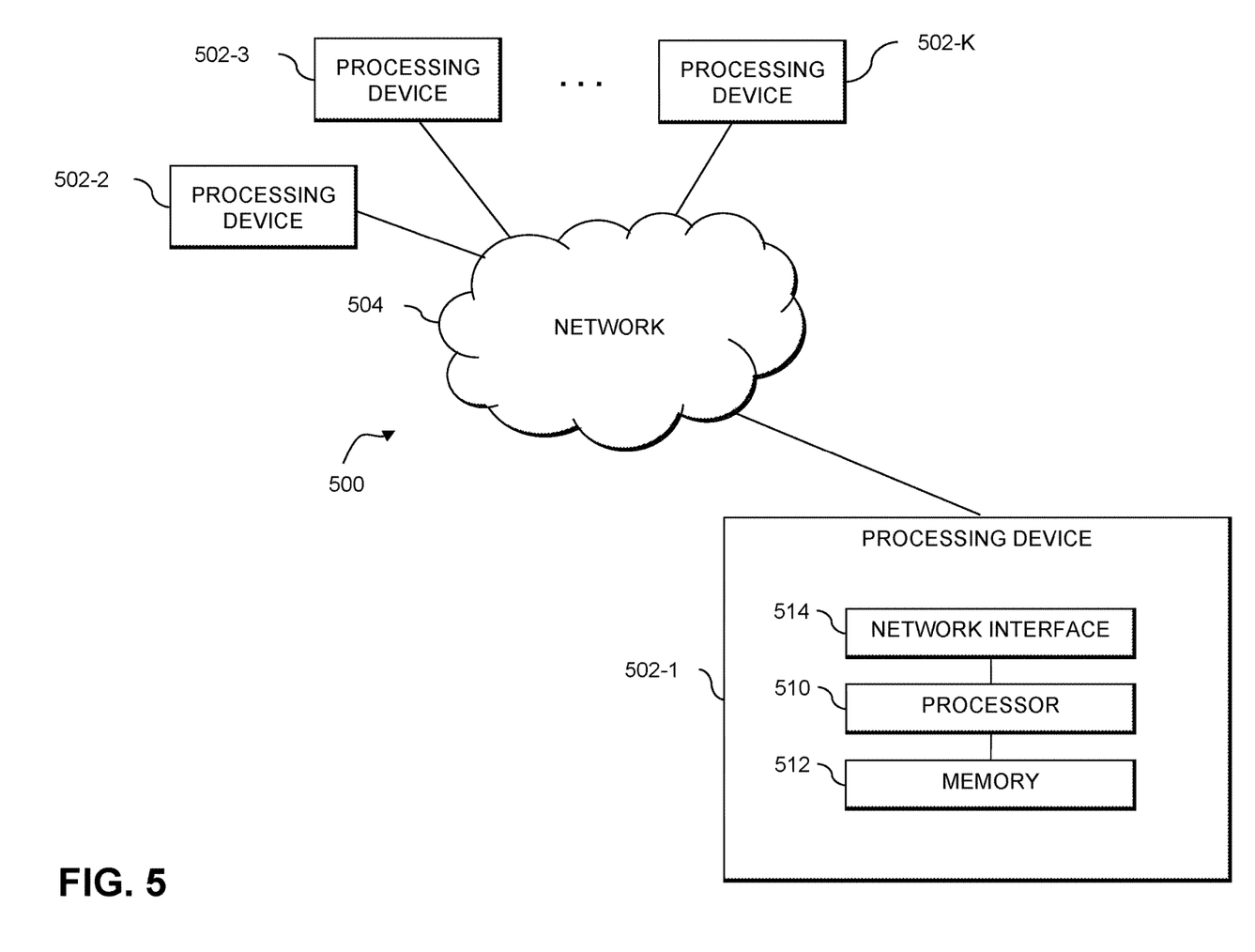

Illustrative embodiments of processing platforms will now be described in greater detail with reference to FIGS. 4 and 5. Although described in the context of system 100, these platforms may also be used to implement at least portions of other information processing systems in other embodiments. FIG. 4 shows an example processing platform comprising cloud infrastructure 400. The cloud infrastructure 400 comprises a combination of physical and virtual processing resources that are utilized to implement at least a portion of the information processing system 100. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 comprise respective VMs, respective sets of one or more containers, or respective sets of one or more containers running in VMs. In some implementations of the FIG. 4 embodiment, the VMs/container sets 402 comprise respective VMs implemented using virtualization infrastructure 404 that comprises at least one hypervisor.

A hypervisor platform may be used to implement a hypervisor within the virtualization infrastructure 404, wherein the hypervisor platform has an associated virtual infrastructure management system. The underlying physical machines comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 502-1 in the processing platform 500 comprises a processor 510 coupled to a memory 512.

The processor 510 comprises a microprocessor, a CPU, a GPU, a TPU, a microcontroller, an ASIC, a FPGA or other type of processing circuitry, as well as portions or combinations of such circuitry elements.

The memory 512 comprises random access memory (RAM), read-only memory (ROM) or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
    generating one or more text captions for an image relating to a web page by processing at least a portion of the image using at least one artificial intelligence-based image captioning model;
    determining context information pertaining to at least a portion of the image by processing one or more portions of the image using at least one artificial intelligence-based context and emotion recognition library;
    generating context-based alternative text for at least a portion of the image by processing, using at least one artificial intelligence-based alternative text generation model, at least a portion of one or more of the one or more generated text captions for the image and the determined context information pertaining to at least a portion of the image; and
    performing one or more automated actions based at least in part on the generated context-based alternative text, wherein performing one or more automated actions comprises:
        automatically inserting at least a portion of the generated context-based alternative text into at least one particular portion of application code of the web page, and wherein the at least one particular portion of the application code is determined by parsing content contained within the application code for one or more code-related identifiers; and
        automatically updating at least a portion of the one or more code-related identifiers associated with the at least one particular portion of the application code;
    wherein the method is performed by at least one processing device comprising a processor coupled to a memory.

2. The computer-implemented method of claim 1, further comprising:
    automatically training the at least one artificial intelligence-based alternative text generation model using at least one of one or more supervised learning techniques and one or more unsupervised learning techniques.

3. The computer-implemented method of claim 1, wherein performing one or more automated actions comprises:
    obtaining user feedback pertaining to the generated context-based alternative text; and
    automatically training, using at least a portion of the user feedback, one or more of the at least one artificial intelligence-based image captioning model, the at least one artificial intelligence-based alternative text generation model, and the at least one artificial intelligence-based context and emotion recognition library.

4. The computer-implemented method of claim 1, wherein generating context-based alternative text for at least a portion of the image comprises updating an existing set of alternative text for the at least a portion of the image.

5. The computer-implemented method of claim 1, wherein determining context information pertaining to at least a portion of the image comprises:
    identifying at least one of one or more facial gestures and one or more body gestures in the image; and
    determining one or more emotional indications derived from the at least one of one or more identified facial gestures and one or more identified body gestures.

6. The computer-implemented method of claim 1, wherein processing at least a portion of the image using at least one artificial intelligence-based image captioning model comprises processing the at least a portion of the image using one or more deep learning models.

7. The computer-implemented method of claim 6, wherein processing the at least a portion of the image using one or more deep learning models comprises processing the at least a portion of the image using at least one of one or more convolutional neural networks, one or more residual neural networks, and one or more deep neural networks.

8. The computer-implemented method of claim 1, wherein determining context information pertaining to at least a portion of the image comprises automatically identifying one or more actions depicted in the at least a portion of the image.

9. The computer-implemented method of claim 1, wherein determining context information pertaining to at least a portion of the image comprises automatically identifying one or more scenery variables depicted in the at least a portion of the image.

10. The computer-implemented method of claim 1, wherein determining context information pertaining to at least a portion of the image comprises automatically identifying one or more event types depicted in the at least a portion of the image.

11. The computer-implemented method of claim 1, further comprising:
    extracting text from the image by processing one or more portions of the image using at least one artificial intelligence-based optical character recognition model; and
    automatically training the at least one artificial intelligence-based alternative text generation model using at least a portion of one or more of the one or more generated text captions for the image, the extracted text from the image, and the determined context information pertaining to at least a portion of the image.

12. A non-transitory processor-readable storage medium having stored therein program code of one or more software programs, wherein the program code when executed by at least one processing device causes the at least one processing device:

to generate one or more text captions for an image relating to a web page by processing at least a portion of the image using at least one artificial intelligence-based image captioning model;

to determine context information pertaining to at least a portion of the image by processing one or more portions of the image using at least one artificial intelligence-based context and emotion recognition library;

to generate context-based alternative text for at least a portion of the image by processing, using at least one artificial intelligence-based alternative text generation model, at least a portion of one or more of the one or more generated text captions for the image and the determined context information pertaining to at least a portion of the image; and     to perform one or more automated actions based at least in part on the generated context-based alternative text, wherein performing one or more automated actions comprises:

automatically inserting at least a portion of the generated context-based alternative text into at least one particular portion of application code of the web page, wherein the at least one particular portion of the application code is determined by parsing content contained within the application code for one or more code-related identifiers; and         automatically updating at least a portion of the one or more code-related identifiers associated with the at least one particular portion of the application code.

13. The non-transitory processor-readable storage medium of claim 12, wherein performing one or more automated actions comprises:

obtaining user feedback pertaining to the generated context-based alternative text; and     automatically training, using at least a portion of the user feedback, one or more of the at least one artificial intelligence-based image captioning model, the at least one artificial intelligence-based alternative text generation model, and the at least one artificial intelligence-based context and emotion recognition library.

14. The non-transitory processor-readable storage medium of claim 12, wherein generating context-based alternative text for at least a portion of the image comprises updating an existing set of alternative text for the at least a portion of the image.

15. An apparatus comprising:

at least one processing device comprising a processor coupled to a memory;

the at least one processing device being configured:

to generate one or more text captions for an image relating to a web page by processing at least a portion of the image using at least one artificial intelligence-based image captioning model;

to determine context information pertaining to at least a portion of the image by processing one or more portions of the image using at least one artificial intelligence-based context and emotion recognition library;

to generate context-based alternative text for at least a portion of the image by processing, using at least one artificial intelligence-based alternative text generation model, at least a portion of one or more of the one or more generated text captions for the image and the determined context information pertaining to at least a portion of the image; and         to perform one or more automated actions based at least in part on the generated context-based alternative text, wherein performing one or more automated actions comprises;

automatically inserting at least a portion of the generated context-based alternative text into at least one particular portion of application code of the web page, wherein the at least one particular portion of the application code is determined by parsing content contained within the application code for one or more code-related identifiers; and             automatically updating at least a portion of the one or more code-related identifiers associated with the at least one particular portion of the application code.

16. The apparatus of claim 15, wherein performing one or more automated actions comprises:

obtaining user feedback pertaining to the generated context-based alternative text; and     automatically training, using at least a portion of the user feedback, one or more of the at least one artificial intelligence-based image captioning model, the at least one artificial intelligence-based alternative text generation model, and the at least one artificial intelligence-based context and emotion recognition library.

17. The apparatus of claim 15, wherein generating context-based alternative text for at least a portion of the image comprises updating an existing set of alternative text for the at least a portion of the image.

18. The apparatus of claim 15, wherein processing at least a portion of the image using at least one artificial intelligence-based image captioning model comprises processing the at least a portion of the image using one or more deep learning models.

19. The apparatus of claim 15, wherein determining context information pertaining to at least a portion of the image comprises automatically identifying one or more actions depicted in the at least a portion of the image.

20. The apparatus of claim 15, wherein determining context information pertaining to at least a portion of the image comprises automatically identifying one or more scenery variables depicted in the at least a portion of the image.

\* \* \* \* \*